United States Patent
Davis

(10) Patent No.: US 9,776,079 B2
(45) Date of Patent: Oct. 3, 2017

(54) ACTUATING AT LEAST ONE GYROSCOPE TO APPLY FORCE AT A DEVICE

(71) Applicant: LENOVO (SINGAPORE) PTE. LTD., New Tech Park (SG)

(72) Inventor: Mark Charles Davis, Durham, NC (US)

(73) Assignee: LENOVO (SINGAPORE) PTE. LTD., New Tech Park (SG)

( * ) Notice: Subject to any disclaimer, the term of this patent is extended or adjusted under 35 U.S.C. 154(b) by 262 days.

(21) Appl. No.: 14/269,485

(22) Filed: May 5, 2014

(65) Prior Publication Data

US 2015/0319340 A1   Nov. 5, 2015

(51) Int. Cl.
  *G06F 3/01* (2006.01)
  *A63F 13/211* (2014.01)
  *H04N 5/04* (2006.01)
  *A63F 13/22* (2014.01)
  *A63F 13/285* (2014.01)

(52) U.S. Cl.
  CPC ............ *A63F 13/211* (2014.09); *A63F 13/22* (2014.09); *A63F 13/285* (2014.09); *G06F 3/01* (2013.01); *G06F 3/016* (2013.01); *H04N 5/04* (2013.01)

(58) Field of Classification Search
  CPC ....... G06F 3/0346; G07F 17/32; G01C 19/38; G01C 19/34; A63F 13/10; A63F 2300/1006; A63F 13/06
  See application file for complete search history.

(56) References Cited

U.S. PATENT DOCUMENTS

| 4,443,952 A | * | 4/1984 | Schulien | G01C 19/34 33/324 |
| 2009/0054144 A1 | * | 2/2009 | Peng | A63F 13/06 463/36 |
| 2010/0099494 A1 | * | 4/2010 | Dohta | A63F 13/02 3/2 |
| 2010/0248833 A1 | * | 9/2010 | Okamura | A63F 13/06 463/36 |
| 2011/0306418 A1 | * | 12/2011 | Yamada | A63F 13/06 463/36 |
| 2013/0040718 A1 | * | 2/2013 | Sparks et al. | 463/16 |
| 2014/0352462 A1 | * | 12/2014 | Wood | F03G 3/08 74/5.7 |

* cited by examiner

*Primary Examiner* — Kevin M Nguyen
(74) *Attorney, Agent, or Firm* — John L. Rogitz; John M. Rogitz

(57) ABSTRACT

In one aspect, a device includes at least one gyroscope, a processor, and a memory accessible to the processor. The memory bears instructions executable by the processor to identify a force-related parameter to apply at the device, and actuate the gyroscope to apply the force based at least in part on the identification.

20 Claims, 5 Drawing Sheets

ACTUATING AT LEAST ONE GYROSCOPE TO APPLY FORCE AT A DEVICE

I. FIELD

The present application relates generally to actuating one or more gyroscopes to apply force at a device.

II. BACKGROUND

Experiencing sensations of motion and/or force at a device such as e.g. a game controller or smart phone is often desirable. Currently, in order to convey such sensations, devices are equipped with relatively heavy weights that are to be shifted about. However, these weights add too much overall weight to the device, making the device undesirable to handle, transport, and use.

SUMMARY

Accordingly, in one aspect, a device includes at least one gyroscope, a processor, and a memory accessible to the processor. The memory bears instructions executable by the processor to identify a force-related parameter to apply at the device, and actuate the gyroscope to apply the force based at least in part on the identification.

In another aspect, a method includes presenting audio video (AV) content on a display of a first device and actuating a gyroscope to correspond to motion represented in the AV content.

In still another aspect, a device includes at least one gyroscope, a processor, and a memory accessible to the processor. The memory bears instructions executable by the processor to identify a direction-related parameter for force to apply at the device based at least in part on movement of the device, and control the gyroscope to apply force in the direction based at least in part on the identification.

The details of present principles, both as to their structure and operation, can best be understood in reference to the accompanying drawings, in which like reference numerals refer to like parts, and in which:

DETAILED DESCRIPTION

Figure 1:
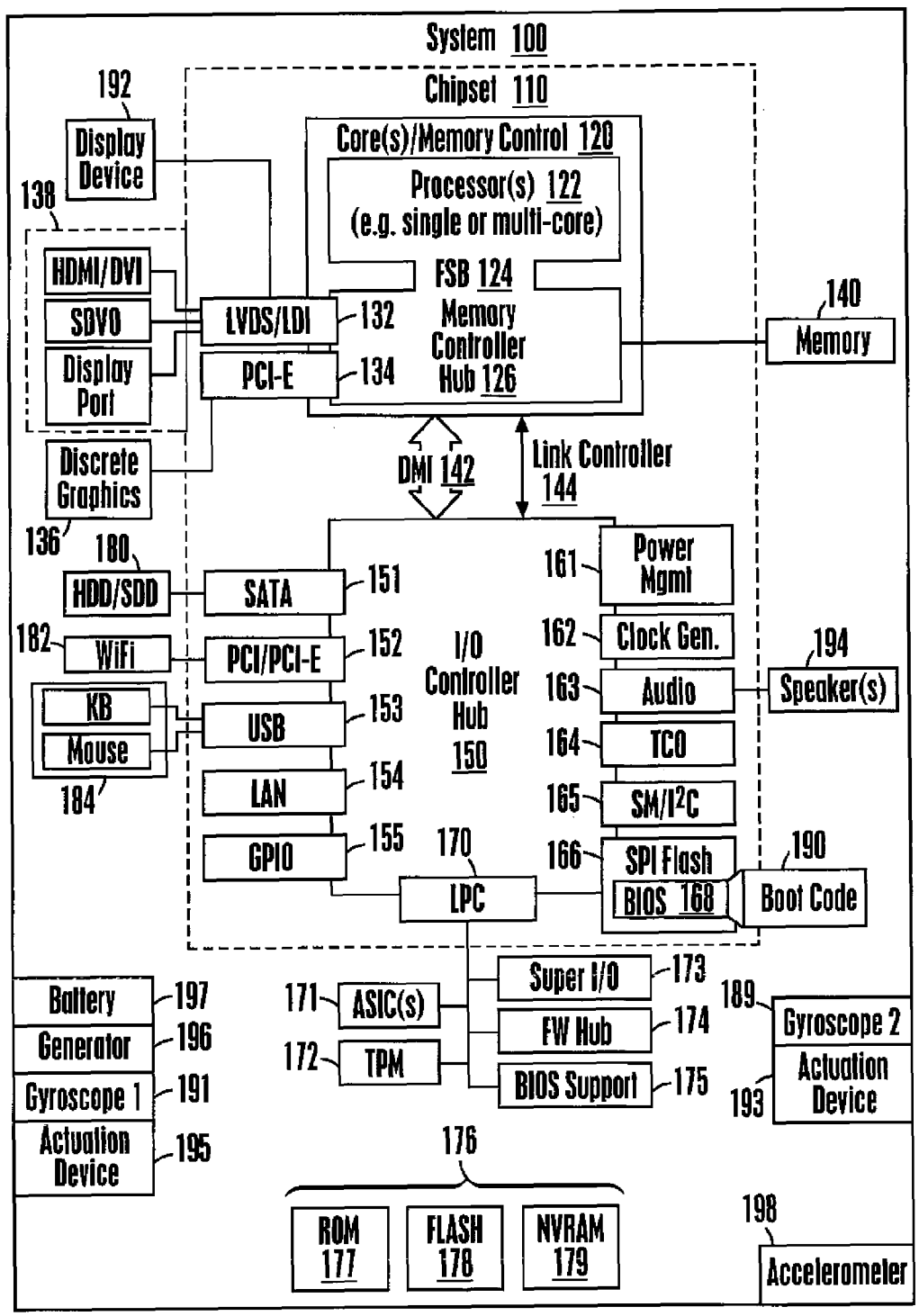
FIG. 1 is a block diagram of an example system in accordance with present principles.

This disclosure relates generally to device-based information. With respect to any computer systems discussed herein, a system may include server and client components, connected over a network such that data may be exchanged between the client and server components. The client components may include one or more computing devices including televisions (e.g. smart TVs, Internet-enabled TVs), computers such as desktops, laptops and tablet computers, so-called convertible devices (e.g. having a tablet configuration and laptop configuration), and other mobile devices including smart phones. These client devices may employ, as non-limiting examples, operating systems from Apple, Google, or Microsoft. A Unix or similar such as Linux operating system may be used. These operating systems can execute one or more browsers such as a browser made by Microsoft or Google or Mozilla or other browser program that can access web applications hosted by the Internet servers over a network such as the Internet, a local intranet, or a virtual private network.

As used herein, instructions refer to computer-implemented steps for processing information in the system. Instructions can be implemented in software, firmware or hardware; hence, illustrative components, blocks, modules, circuits, and steps are set forth in terms of their functionality.

A processor may be any conventional general purpose single- or multi-chip processor that can execute logic by means of various lines such as address lines, data lines, and control lines and registers and shift registers. Moreover, any logical blocks, modules, and circuits described herein can be implemented or performed, in addition to a general purpose processor, in or by a digital signal processor (DSP), a field programmable gate array (FPGA) or other programmable logic device such as an application specific integrated circuit (ASIC), discrete gate or transistor logic, discrete hardware components, or any combination thereof designed to perform the functions described herein. A processor can be implemented by a controller or state machine or a combination of computing devices.

Any software and/or applications described by way of flow charts and/or user interfaces herein can include various sub-routines, procedures, etc. It is to be understood that logic divulged as being executed by e.g. a module can be redistributed to other software modules and/or combined together in a single module and/or made available in a shareable library.

Logic when implemented in software, can be written in an appropriate language such as but not limited to C# or C++, and can be stored on or transmitted through a computer-readable storage medium (e.g. that may not be a carrier wave) such as a random access memory (RAM), read-only memory (ROM), electrically erasable programmable read-only memory (EEPROM), compact disk read-only memory (CD-ROM) or other optical disk storage such as digital versatile disc (DVD), magnetic disk storage or other magnetic storage devices including removable thumb drives, etc. A connection may establish a computer-readable medium. Such connections can include, as examples, hard-wired cables including fiber optics and coaxial wires and twisted pair wires. Such connections may include wireless communication connections including infrared and radio.

In an example, a processor can access information over its input lines from data storage, such as the computer readable storage medium, and/or the processor can access information wirelessly from an Internet server by activating a wireless transceiver to send and receive data. Data typically is converted from analog signals to digital by circuitry between the antenna and the registers of the processor when being received and from digital to analog when being transmitted. The processor then processes the data through its shift registers to output calculated data on output lines, for presentation of the calculated data on the device.

Components included in one embodiment can be used in other embodiments in any appropriate combination. For example, any of the various components described herein and/or depicted in the Figures may be combined, interchanged or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together, etc.

"A system having one or more of A, B, and C" (likewise "a system having one or more of A, B, or C" and "a system having one or more of A, B, C") includes systems that have A alone, B alone, C alone, A and B together, A and C together, B and C together, and/or A, B, and C together, etc.

The term "circuit" or "circuitry" is used in the summary, description, and/or claims. As is well known in the art, the term "circuitry" includes all levels of available integration, e.g., from discrete logic circuits to the highest level of circuit integration such as VLSI, and includes programmable logic components programmed to perform the functions of an embodiment as well as general-purpose or special-purpose processors programmed with instructions to perform those functions.

Now specifically in reference to FIG. 1, it shows an example block diagram of an information handling system and/or computer system 100. Note that in some embodiments the system 100 may be a desktop computer system, such as one of the ThinkCentre® or ThinkPad® series of personal computers sold by Lenovo (US) Inc. of Morrisville, N.C., or a workstation computer, such as the ThinkStation®, which are sold by Lenovo (US) Inc. of Morrisville, N.C.; however, as apparent from the description herein, a client device, a server or other machine in accordance with present principles may include other features or only some of the features of the system 100. Also, the system 100 may be e.g. a game console such as XBOX® or Playstation®.

As shown in FIG. 1, the system 100 includes a so-called chipset 110. A chipset refers to a group of integrated circuits, or chips, that are designed to work together. Chipsets are usually marketed as a single product (e.g., consider chipsets marketed under the brands INTEL®, AMD®, etc.).

In the example of FIG. 1, the chipset 110 has a particular architecture, which may vary to some extent depending on brand or manufacturer. The architecture of the chipset 110 includes a core and memory control group 120 and an I/O controller hub 150 that exchange information (e.g., data, signals, commands, etc.) via, for example, a direct management interface or direct media interface (DMI) 142 or a link controller 144. In the example of FIG. 1, the DMI 142 is a chip-to-chip interface (sometimes referred to as being a link between a "northbridge" and a "southbridge").

The core and memory control group 120 include one or more processors 122 (e.g., single core or multi-core, etc.) and a memory controller hub 126 that exchange information via a front side bus (FSB) 124. As described herein, various components of the core and memory control group 120 may be integrated onto a single processor die, for example, to make a chip that supplants the conventional "northbridge" style architecture.

The memory controller hub 126 interfaces with memory 140. For example, the memory controller hub 126 may provide support for DDR SDRAM memory (e.g., DDR, DDR2, DDR3, etc.). In general, the memory 140 is a type of random-access memory (RAM). It is often referred to as "system memory."

The memory controller hub 126 further includes a low-voltage differential signaling interface (LVDS) 132. The LVDS 132 may be a so-called LVDS Display Interface (LDI) for support of a display device 192 (e.g., a CRT, a flat panel, a projector, a touch-enabled display, etc.). A block 138 includes some examples of technologies that may be supported via the LVDS interface 132 (e.g., serial digital video, HDMI/DVI, display port). The memory controller hub 126 also includes one or more PCI-express interfaces (PCI-E) 134, for example, for support of discrete graphics 136. Discrete graphics using a PCI-E interface has become an alternative approach to an accelerated graphics port (AGP). For example, the memory controller hub 126 may include a 16-lane (x16) PCI-E port for an external PCI-E-based graphics card (including e.g. one of more GPUs). An example system may include AGP or PCI-E for support of graphics.

The I/O hub controller 150 includes a variety of interfaces. The example of FIG. 1 includes a SATA interface 151, one or more PCI-E interfaces 152 (optionally one or more legacy PCI interfaces), one or more USB interfaces 153, a LAN interface 154 (more generally a network interface for communication over at least one network such as the Internet, a WAN, a LAN, etc. under direction of the processor(s) 122), a general purpose I/O interface (GPIO) 155, a low-pin count (LPC) interface 170, a power management interface 161, a clock generator interface 162, an audio interface 163 (e.g., for speakers 194 to output audio), a total cost of operation (TCO) interface 164, a system management bus interface (e.g., a multi-master serial computer bus interface) 165, and a serial peripheral flash memory/controller interface (SPI Flash) 166, which, in the example of FIG. 1, includes BIOS 168 and boot code 190. With respect to network connections, the I/O hub controller 150 may include integrated gigabit Ethernet controller lines multiplexed with a PCI-E interface port. Other network features may operate independent of a PCI-E interface.

The interfaces of the I/O hub controller 150 provide for communication with various devices, networks, etc. For example, the SATA interface 151 provides for reading, writing or reading and writing information on one or more drives 180 such as HDDs, SDDs or a combination thereof, but in any case the drives 180 are understood to be e.g. tangible computer readable storage mediums that may not be carrier waves. The I/O hub controller 150 may also include an advanced host controller interface (AHCI) to support one or more drives 180. The PCI-E interface 152 allows for wireless connections 182 to devices, networks, etc. The USB interface 153 provides for input devices 184 such as keyboards (KB), mice and various other devices (e.g., cameras, phones, storage, media players, etc.).

In the example of FIG. 1, the LPC interface 170 provides for use of one or more ASICs 171, a trusted platform module (TPM) 172, a super I/O 173, a firmware hub 174, BIOS support 175 as well as various types of memory 176 such as ROM 177, Flash 178, and non-volatile RAM (NVRAM) 179. With respect to the TPM 172, this module may be in the form of a chip that can be used to authenticate software and hardware devices. For example, a TPM may be capable of performing platform authentication and may be used to verify that a system seeking access is the expected system.

The system 100, upon power on, may be configured to execute boot code 190 for the BIOS 168, as stored within the SPI Flash 166, and thereafter processes data under the control of one or more operating systems and application software (e.g., stored in system memory 140). An operating system may be stored in any of a variety of locations and accessed, for example, according to instructions of the BIOS 168.

Still in reference to FIG. 1, at least one and optionally plural gyroscopes 189 and 191 are shown for e.g. sensing and/or measuring motion and/or the orientation of the system 100. Furthermore, the gyroscopes 189 and 191 are understood to be manipulable under control of the processor 122 to apply and/or exert force at and/or on the system 100 in various directions and magnitudes in accordance with present principles. E.g., the processor 122 may communicate with respective actuation devices 193 and 195 respectively associated with the gyroscopes 189 and 191 to operate the actuation devices 193 and 195 to e.g. apply torque to the gyroscopes 189 and 191 (e.g. to create precession-related forces at and/or upon the system 100), to increase or decrease angular momentum of the gyroscopes 189 and 191, and/or to alter the respective axes of rotation of the gyroscopes 189 and 191. Accordingly, it is to be understood that in example embodiments, the actuation devices 193 and 195 may include one or more of motors (e.g. stepper motors for e.g. rotary-like positioning) for e.g. altering the axes of rotation. The devices 193 and 195 may also include e.g. torque applicators for applying torque to the gyroscopes 189 and 191.

In addition to the foregoing, the system 100 may also include at least one generator 196 coupled to at least one of the gyroscopes 189 and 191 (it being understood that both gyroscopes 189 and 191 may be coupled to the generator 196 and/or may respectively be coupled to their own respective generator). The generator 196 is understood to be configured for e.g. harnessing and/or gathering energy from the gyroscopes 189 and 191 to charge a battery such as the battery 197 of the system 100, such as e.g. when the force from the gyroscopes 189 and 191 is being reduced in accordance with present principles (e.g. when angular momentum is being reduced). However, present principles also recognize that the generator 196 may harness and/or gather energy based on the motion of the gyroscopes 189 and 191 during other periods of actuation and/or operation of the gyroscopes 189 and 191, such as e.g. during an increase in the application of force using the gyroscopes 189 and 191.

Still in reference to FIG. 1, note that it also shows an accelerometer 198 for e.g. sensing acceleration and/or movement of the system 100.

Figure 2:
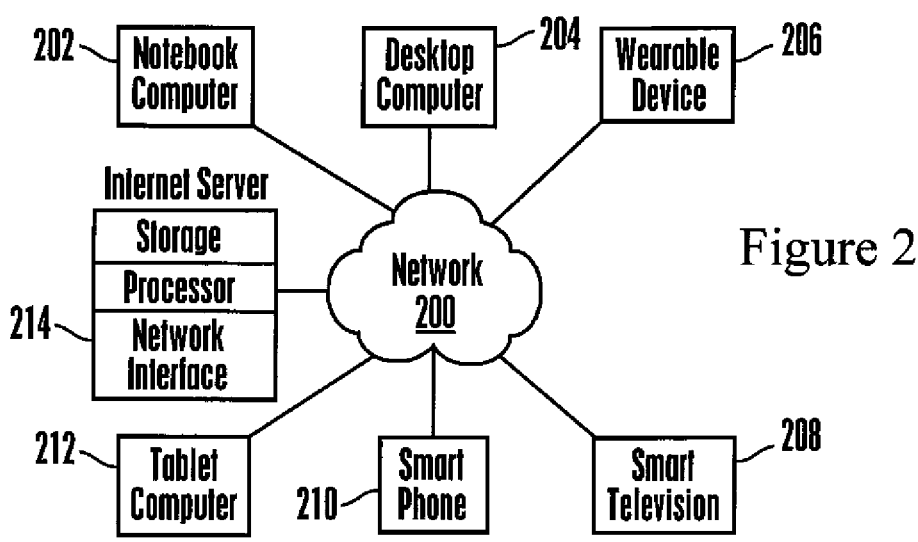
FIG. 2 is a block diagram of a network of devices in accordance with present principles.

Before moving on to FIG. 2, it is to be understood that an example client device or other machine/computer may include fewer or more features than shown on the system 100 of FIG. 1. In any case, it is to be understood at least based on the foregoing that the system 100 is configured to undertake present principles.

Turning now to FIG. 2, it shows example devices communicating over a network 200 such as e.g. the Internet in accordance with present principles. It is to be understood that e.g. each of the devices described in reference to FIG. 2 may include at least some of the features, components, and/or elements of the system 100 described above. In any case, FIG. 2 shows a notebook computer 202, a desktop computer 204, a wearable device 206 such as e.g. a smart watch, a smart television (TV) 208, a smart phone 210, a tablet computer 212, and a server 214 in accordance with present principles such as e.g. an Internet server that may e.g. provide cloud storage accessible to the devices 202-212. It is to be understood that the devices 202-214 are configured to communicate with each other over the network 200 to undertake present principles.

Figure 3:
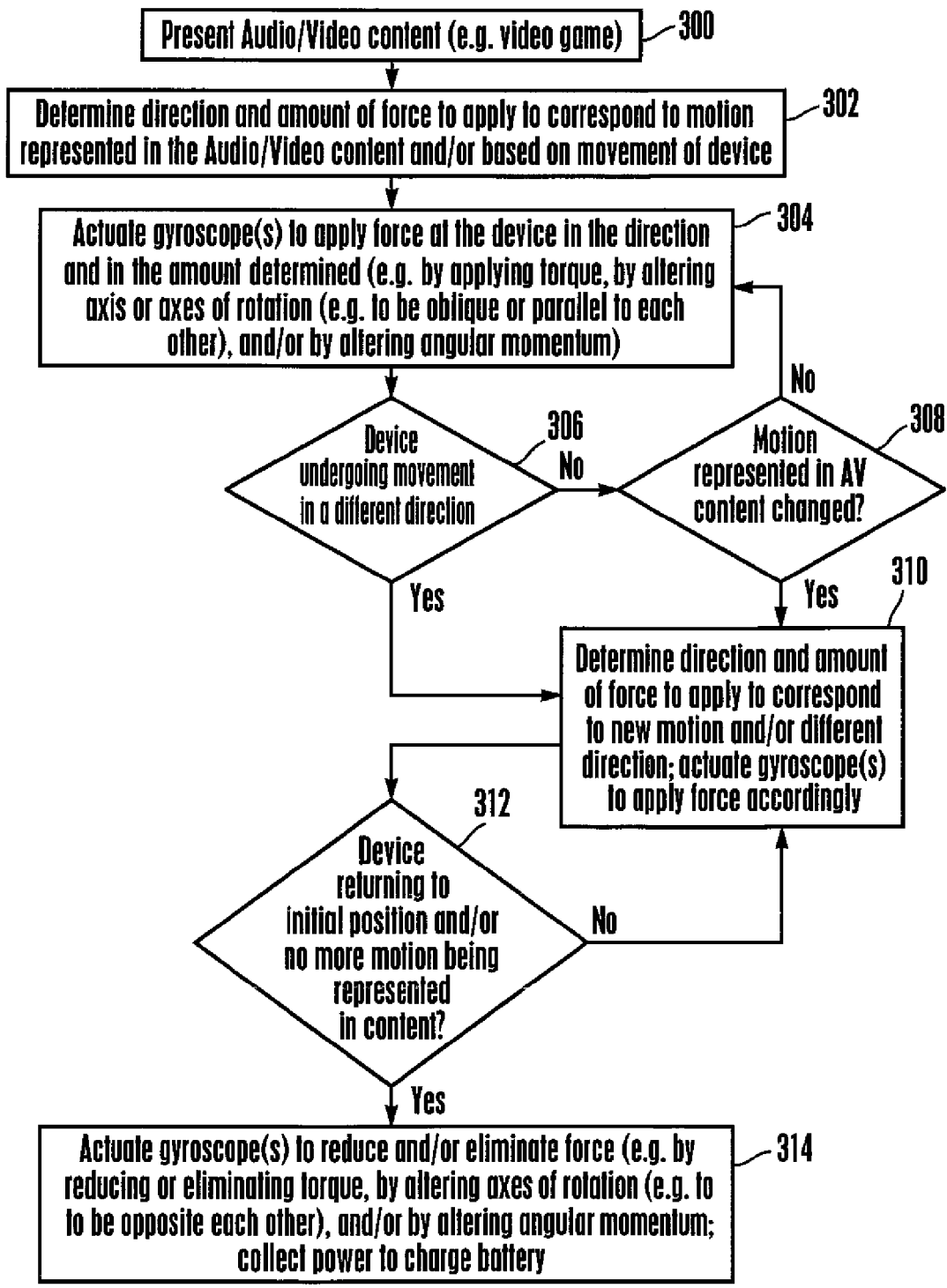
FIG. 3 is a flow chart showing an example algorithm in accordance with present principles.

Referring to FIG. 3, it shows example logic that may be undertaken by a device such as the system 100 in accordance with present principles. Beginning at block 300, the logic presents audio video (AV) content such as e.g. a video game (e.g. from a video game console and/or stored locally on the device), a motion picture, a feed from a set top box, etc. The logic then proceeds to block 302 where the logic determines and/or identifies (e.g. at least parameters related to) a direction and/or amount of force to apply using gyroscopes on the device undertaking the present logic (referred to below as the "present device"), such as the gyroscopes 189 and 191 described above. Note that in example embodiments the direction and/or amount of force to apply is to correspond to motion represented in the AV content (e.g. momentum and/or motion acting on an object represented in the AV content in a particular direction at a particular magnitude, which is thus to correspond to the direction and amount of force determined by the present device). E.g., in one non-limiting example, an object represented in the AV content (e.g. a vehicle) for which force at the present device is to correspond (e.g. in the video game example, based on game administrator settings which are accessible to the present device and which indicate the vehicle as being the object in the AV content for which force at the present device is to correspond) may have a motion vector of a direction and magnitude associated therewith and/or determined at various points during presentation of the AV content (e.g. based on information provided by the administrator of the AV content and/or based on video game processing principles).

Thus, the logic may access or otherwise determine this motion vector of a particular magnitude and direction, and actuate the gyroscopes to correspondingly apply e.g. an equal (or a scaled) force in an opposite direction (e.g., relative to the present device being held in an upright position and oriented forward toward the presentation of the AV content, relative to a plane at the present device parallel to a plane established by the front of the display on which the AV content is presented, and/or relative to the field of view of a person when viewing the AV content in an upright perspective) by e.g. creating a precession-related force in the opposite direction at a particular magnitude based on changes to the angular momentum, applied torque, and/or direction of the axes of rotation of the gyroscopes.

Also note that in addition to or in lieu of the determination at block 302 being based on the motion represented in the AV content, the determination may be based on movement of the present device itself. E.g., a user orienting a video game controller one way or another when playing a race car video game to steer a vehicle represented in the video game (and with the game presented from the perspective of the vehicle's driver) may be detected by the gyroscopes and/or an accelerometer in the controller, and (e.g. assuming the car is represented as being in motion when it is turned using the controller) a force may be applied at the controller in a direction opposite the direction of the centrifugal force represented in the game to thus provide the sensation through the controller that the user is being "pushed" against a portion of the vehicle owing to the centrifugal force. Thus, in this example motion vectors may generated or determined by the processor executing the video game and used to indicate a direction and magnitude of (e.g. virtual) centrifugal force on the vehicle by visually representing such centrifugal force in the AV content itself as e.g. momentary shifts to the left or right in the driver's perspective inside the vehicle based on the user "turning" the vehicle using the controller. These vectors may be communicated to the controller itself to be used to apply a force thereat.

In any case, after block 302 the logic proceeds to block 304 where the logic actuates the gyroscopes to apply force at the present device in the direction and in the amount determined at block 302 by e.g. applying torque to the gyroscopes, by altering one or both axes of rotation of the gyroscopes (e.g. to at least not be opposite each other such e.g. being oblique to each other, though in some embodiments the directions may be parallel to each other), and/or by altering the angular momentum of the gyroscopes. From block 304 the logic proceeds to decision diamond 306.

At diamond 306, the logic determines whether the present device is and/or has undergone additional movement, such as e.g. movement in a different direction or additional (e.g. increased) movement in the same direction. An affirmative determination at diamond 306 causes the logic to proceed to block 310, which will be described shortly. However, it is to be understood that a negative determination at diamond 306 instead causes the logic to proceed to decision diamond 308. At diamond 308 the logic determines whether motion for an object represented in the AV content has changed, such as e.g. an object in the AV content changing directions as represented in the AV content. A negative determination at diamond 308 causes the logic to revert back to block 304.

However, an affirmative determination at diamond 308 (and as noted above an affirmative determination at diamond 306) causes the logic to proceed to block 310. At block 310 the logic determines another direction and/or amount of force to apply at the present device to correspond to the additional movement determined at diamond 306 and/or to correspond to the change in motion represented in the AV content determined at diamond 308. Accordingly, and also at block 310, the logic actuates the gyroscopes to apply force at the present device according to the determination made thereat.

From block 310 the logic proceeds to decision diamond 312. At diamond 312 the logic determines whether the present device is returning or has returned to the (e.g. initial) position it was in prior to movement of the present device that was determined at block 302. In addition to or in lieu of the foregoing but also at diamond 312, the logic may determine whether any motion that is or was being represented in the content has ceased or is being reduced. A negative determination at diamond 312 causes the logic to revert back to block 310.

However, an affirmative determination at diamond 312 instead causes the logic to proceed to block 314, at which the logic actuates the gyroscopes to reduce and/or eliminate force being applied at the present device e.g. by reducing or eliminating torque being applied to the gyroscopes (e.g. from actuation devices such as the devices 193 and 195 described above), by altering the axes of rotation of the gyroscopes to be oriented in directions opposite each other to e.g. reduce and/or eliminate precession (e.g. at least as may be experienced by a user when holding the device) and hence eliminate precession-related forces applied at the present device in accordance with present principles, and/or by altering the respective angular momentums of the gyroscopes such as e.g. reducing or eliminating the angular momentums of the respective gyroscopes. Note that also at block 314, the logic may actuate one or more generators coupled to the gyroscopes such as the generator 196 described above to collect power to charge a battery of the system 100, such as the battery 197 described above.

Figure 4:
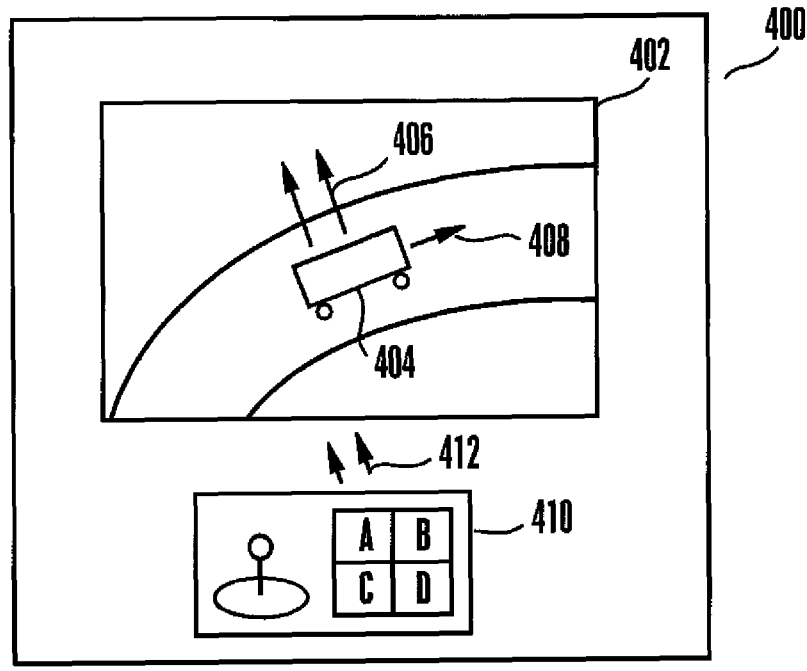
FIGS. 4 and 5 are example illustrations in accordance with present principles.

Continuing the detailed description in reference to FIG. 4, it shows an example illustration 400 of a race car video game being presented on e.g. a television 402. As may be appreciated from the illustration 400, the video game shows a car 404 which may be represented and/or simulated on the television 402 as undergoing and/or experiencing force in a direction indicated by arrows 406 perpendicular to the direction and/or angular momentum of the car 404 indicated by arrow 408 based on e.g. centrifugal force simulated and/or represented in the video game as occurring. Thus, it is to be understood that a motion vector (e.g. pertaining to the same direction as the arrows 406) may be communicated by the device operating the video game (e.g. the television 402) to a video game controller 410 to generate force thereat based on the motion vector. Accordingly, note that arrows 412 indicate a direction of force being applied at the controller 410 based on actuation of gyroscopes in the controller 410 in accordance with present principles.

Figure 5:
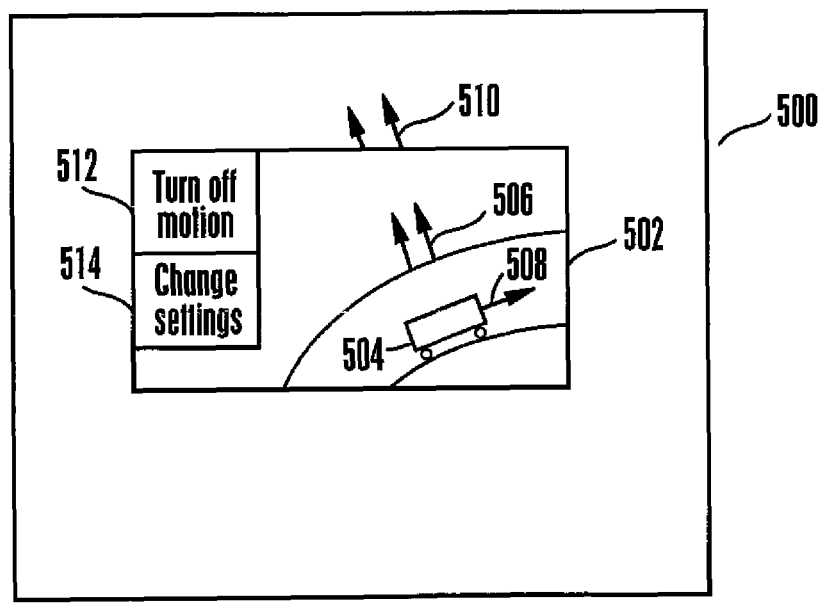

Now in reference to FIG. 5, it shows an example illustration 500 of a device 502 such as e.g. a smart phone presenting a race car video game. As may be appreciated from the illustration 500, the video game shows a car 504 represented on the device 502 which may be represented and/or simulated on the device 502 as undergoing and/or experiencing force in a direction indicated by arrows 506 perpendicular to the direction and/or angular momentum of the car 504 indicated by arrow 508 based on e.g. centrifugal force simulated and/or indicated in the video game as occurring. Thus, it is to be understood that a motion vector (e.g. pertaining to the same direction as the arrows 506) may be determined and/or recognized by the device 502 when e.g. operating and/or presenting the video game to generate force thereat based on the motion vector. Accordingly, note that arrows 510 indicate a direction of force being applied at the device 502 based on actuation of gyroscopes in the device 502 in accordance with present principles.

Furthermore, as may also be appreciated from FIG. 5, selector elements 512 and 514 pertaining to the application of force at the device 502 are shown. The selector element 512 is selectable (e.g. based on touch input and/or input from an input device such as a mouse) to automatically without further user input responsive thereto cease applying a force being applied at the device based on actuation of gyroscopes in the device 502. The selector element 514 is understood to be selectable to automatically without further user input responsive thereto e.g. pause the video game and present a settings UI such as the UI 600 to be described shortly for configuring and/or altering settings for the application of force at the device 502 using the gyroscopes. Furthermore, though not shown in FIG. 4, it is to be understood that similar selector elements to the elements 512 and 514 may be presented on the display of the television 402 for selection by a user, and/or presented on a display of the controller 410 for selection by a user.

Figure 6:
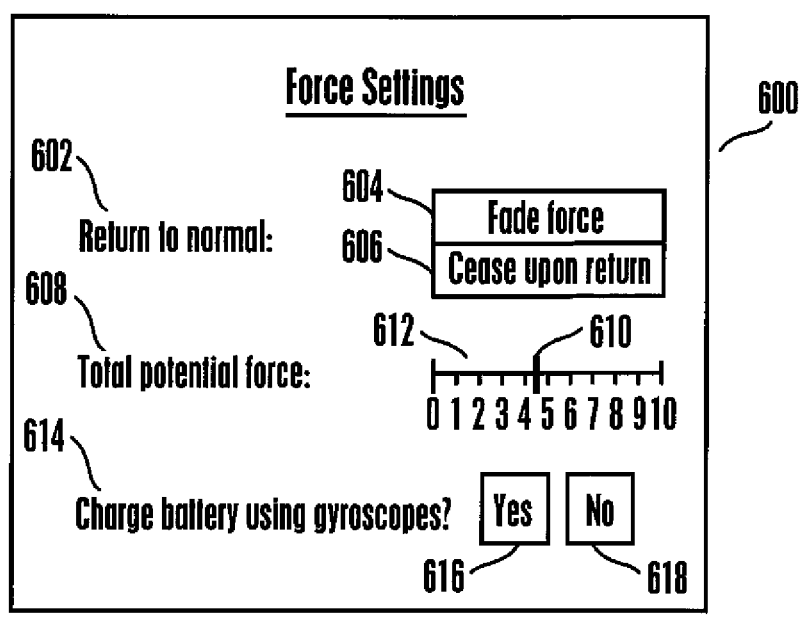
FIG. 6 is an example user interface (UI) in accordance with present principles.

Reference is now made to FIG. 6, which shows the aforementioned example settings UI 600 for configuring settings of a device for applying force thereat u in accordance with present principles. The UI 600 includes a first setting 602 pertaining to the device's "return to normal" which in example embodiments is understood to correspond to instances when no force is to be applied at the device such as e.g. when a vehicle in a race car game is not moving, after the has exited a turn and is no longer undergoing centrifugal force, and/or e.g. after a video game controller such as the controller 410 described above returns to its initial and/or default position after being manipulated to cause a turn in the race car video game. In any case, a first selector element 604 and a second selector element 606 are shown for the first setting 602. The element 604 is understood to be selectable by a user to automatically without further user input configure the device to progressively reduce (e.g. fade) an applied force from an applied force level to zero upon and/or after a return to normal, whereas the element 606 understood to be selectable by a user to automatically without further user input configure the device to (e.g. immediately and/or without progression from an applied force level to lower levels and eventually to zero) cease applying force upon and/or after a return to normal.

The UI 600 also includes a second setting 608 to configure a user-defined force threshold amount for the maximum force to be applied at the device based on actuation of the gyroscopes therein (e.g. that is below a maximum actual force which the gyroscopes are configured to apply based on e.g. their dimensions, weight, and/or configurations). Thus, in the example shown, a slider 610 is understood to be movable on the scale 612 between equal increments from one to ten corresponding to force from zero to a maximum user-defined force (e.g. based on where on the scale 612 the user moves the slider 610 to limit the maximum). Also, note that e.g. the increment of ten on the scale 612 may correspond to the actual maximum force which may be produced by the gyroscopes, and hence the user-defined maximum may in some embodiments be the actual maximum.

In addition to the foregoing, the UI 600 includes a third setting 614 for configuring the device to charge the device's battery using a generator collecting power from the gyroscopes in accordance with present principles. Thus, a yes selector element 616 is shown for automatically without further user input configuring the device to do so, while a no selector element 618 is also shown for automatically without further user input configuring the device to decline to do so.

Without reference to any particular figure, it is to be understood that torque may be applied to one or more gyroscopes in a device in accordance with present based on e.g. external force such as user manipulation of the device (e.g. in the context of a video game) to thus cause the device to configure the gyroscopes to apply e.g. an equal (or proportional) opposite force and/or a perpendicular force depending on the configuration of the gyroscopes. Notwithstanding, it is to also be understood that torque may be applied by the device itself e.g. using an actuation device such as the devices 193 and 195 described above to e.g. cause precession of the gyroscopes to thereby apply force experienced by a user at the device when e.g. holding the device.

Also without reference to any particular figure, it is to be understood that when configuring the axes of rotation in embodiments where plural gyroscopes are actuated to apply a force in accordance with present principles, only one or the direction of both axes of rotation may be altered and/or configured to apply a force. Additionally, note that to apply a e.g. maximum (e.g. actual) force which the gyroscopes are configured to apply (e.g. based on the dimensions, weight, weight distribution, and other physical characteristics of the gyroscopes) in a given direction, the axes of rotation may be aligned to be directed parallel to each other.

Furthermore, it is to be understood that actuating plural gyroscopes to apply force as described herein may include e.g. actuating one of the gyroscopes to be rotated about its respective axis of rotation faster than the other gyroscope is rotated about its respective axis of rotation. Also, it is to be understood that in such cases, and indeed in many of the examples described above when two or more gyroscopes are actuated to apply a force, the gyroscopes may be of the same or at least substantially the same dimensions and/or weight as each other.

Still without reference to any particular figure, it is to be understood that although AV content specifically has been referenced herein, e.g. video-only content may also be used in accordance with present principles, as may other types of content.

Additionally, note that e.g. haptic actuators may be used in combination with the gyroscopes discussed herein to provide still other sensations to be experienced by a user at a device undertaking present principles and also e.g. corresponding to motions and/or haptics represented in AV content. Also note that e.g. gyroscopes in accordance with present principles may be included in their own e.g. stand-alone device, which may be (e.g. communicatively and/or electrically) connected to another device such as e.g. a desktop computer or game console presenting AV content in accordance with present principles.

What's more, note that present principles are applicable in embodiments where e.g. a force is to be applied as part of an alarm to occur at a device instead of or in addition to providing the alarm audibly. Also, in some embodiments a first device including gyroscopes as described herein may be e.g. remotely controlled by a second device to apply force at the first device in a direction and magnitude e.g. indicated at the second device.

It may now be appreciated that present principles provide for better real-world interaction with AV content and improve overall user experience of such content. Gyroscopes may be actuated to result in a force that is relatively strong for the rotating mass of the gyroscope involved. It is to be understood that rotating the mass faster gives a stronger and/or more pronounced effect while rotating slower gives a weaker and/or less pronounced effect. Thus, e.g. a video game controller may provide a more realistic feeling to a user based on applications of force thereat (e.g. to cause a sensation to be experienced by a user based on resistance felt at the game controller that is analogous to the resistance a user would actually experience in a vehicle undergoing the movement represented in the video game).

Furthermore, it may also now be appreciated that the orientation of the gyroscopes may be controlled by respective (e.g. stepper) motors to configure the respective axes of rotation in various positions and/or angles relative to each other. E.g., in the "neutral" position for the gyroscopes (e.g. and assuming the gyroscopes have the same mass and/or are rotating about their respective axes at the same speed), the axes of rotation for the gyroscopes may be e.g. one hundred eighty degrees different from each other so that no precession related force would be detected or felt external to the device. Furthermore, by changing to the "maximum" position where both axes of rotation are in parallel, the maximum force which the gyroscopes can exert may be available for use by the device. Put another way, e.g., configuring the axes of rotation in opposite directions may nullify the force felt by a user at the device, whereas configuring the axes of rotation in the same direction may magnify the force felt by a user at the device, where angles (e.g. oblique) of the axes therebetween allows for a force to be applied in between the "minimum" and "maximum."

In addition, it is to be understood that although e.g. a software application for undertaking present principles may be vended with a device such as the system 100, present principles apply in instances where such an application is e.g. downloaded from a server to a device over a network such as the Internet. Furthermore, present principles apply in instances where e.g. such an application is included on a computer readable storage medium that is being vended and/or provided, where the computer readable storage medium is not a carrier wave.

While the particular ACTUATING AT LEAST ONE GYROSCOPE TO APPLY FORCE AT A DEVICE is herein shown and described in detail, it is to be understood that the subject matter which is encompassed by the present application is limited only by the claims.

What is claimed is:

1. A device, comprising:
  at least one gyroscope;

a processor; and
storage accessible to the processor and bearing instructions executable by the processor to:
identify a force-related parameter to apply at the device; and
based at least in part on the identification of the force-related parameter, actuate the gyroscope to apply a force at the device based at least in part on movement of the gyroscope.

2. The device of claim 1, wherein the identification of the force-related parameter to apply at the device is at least partially based on a determination of movement of the device in at least a first direction and at least partially based on motion represented in audio video (AV) content.

3. The device of claim 2, wherein the instructions are further executable to:
determine that the device is undergoing movement in a second direction at least substantially opposite the first direction; and
based on the determination that that the device is undergoing movement in the second direction, reduce the force.

4. The device of claim 1, comprising two gyroscopes, wherein the instructions are executable by the processor to:
based on the identification, actuate the gyroscopes to apply the force at least in part based on alteration of the direction of the axis of rotation of at least one of the gyroscopes.

5. The device of claim 1, comprising two gyroscopes, wherein the instructions are executable by the processor to:
based on the identification, actuate the gyroscopes to apply the force at least in part by increasing the angular momentum of at least one of the gyroscopes about its axis of rotation.

6. The device of claim 1, comprising two gyroscopes, wherein the instructions are executable by the processor to:
based on the identification, actuate the gyroscopes to apply the force at least in part based on application of torque to the gyroscopes, the application of torque being from a source internal to the device.

7. The device of claim 4, wherein the instructions are executable to:
based on the identification, actuate the gyroscopes to apply the force at least in part based on alteration of the directions of the respective axes of rotation of the two gyroscopes.

8. The device of claim 7, wherein the directions of the respective axes of rotation are altered to be directed in at least substantially the same direction.

9. The device of claim 4, wherein the instructions are further executable to:
reduce the force at least in part based on alteration of the respective directions of the axes of rotation of the gyroscopes to be at least substantially opposite each other.

10. The device of claim 5, wherein the instructions are further executable to:
reduce the force by reducing the angular momentum of the gyroscopes about their respective axes from a first amount to a second amount less than the first amount.

11. The device of claim 4, comprising at least one motor controllable by the processor, wherein the direction of the axis of rotation of at least one of the gyroscopes is altered at least in part based on actuation of the at least one motor controllable by the processor.

12. The device of claim 10, wherein the instructions are further executable to:
actuate a generator to collect power based on the motion of the gyroscopes at least during reduction of the force and to charge a battery on the device using the power.

13. A device, comprising:
at least one gyroscope;
a processor; and
storage accessible to the processor and bearing instructions executable by the processor to:
identify a direction-related parameter for force to generate at the device based at least in part on movement of the device; and
based at least in part on the identification, control the gyroscope to apply generate force at the device in the direction.

14. The device of claim 13, wherein device comprises two gyroscopes, and wherein the instructions are executable by the processor to:
control the gyroscopes to be oriented with their respective axes of rotation arranged to be oblique relative to each other.

15. The device of claim 13, wherein the direction is a first direction, and wherein the instructions are executable by the processor to:
identity a second direction-related parameter for force to generate at the device based on additional movement of the device; an
based at least in part on the identification of the second direction-related parameter for force to generate at the device, apply torque to the gyroscope to actuate the gyroscope to generate force in the second direction.

16. A method, comprising:
presenting audio video (AV) content on a display of a first device;
actuating a gyroscope on a second device to correspond to motion represented in the AV content.

17. The method of claim 16, wherein two gyroscopes are actuated to correspond to motion represented in the AV content at least in part by arranging the respective axes of rotation of the gyroscopes to be parallel to each other.

18. The method of claim 17, wherein the gyroscopes are of at least substantially the same dimensions, and wherein the gyroscopes are actuated to correspond to motion represented in the AV content at least in part by actuating one of the gyroscopes to be rotated about its respective axis of rotation faster than the other gyroscope is rotated about its respective axis of rotation.

19. The method of claim 16, wherein two gyroscopes are actuated to correspond to motion represented in the AV content at least in part by changing the respective axes of rotation of the gyroscopes from being opposite each other to not being opposite each other.

20. The method of claim 19, wherein the gyroscopes are of at least substantially the same dimensions, and wherein the two gyroscopes are actuated to correspond to motion represented in the AV content at least in part by arranging the respective axes of rotation of the gyroscopes to be oblique in at least two dimensions relative to each other.

* * * * *